(12) United States Patent
Deng

(10) Patent No.: US 7,826,394 B2
(45) Date of Patent: Nov. 2, 2010

(54) METHOD, SYSTEM AND DEVICE FOR IMPLEMENTING TRAFFIC ENGINEERING

(75) Inventor: Yiou Deng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 109 days.

(21) Appl. No.: 12/031,350

(22) Filed: Feb. 14, 2008

(65) Prior Publication Data

US 2008/0165703 A1 Jul. 10, 2008

Related U.S. Application Data

(63) Continuation of application No. PCT/CN2006/001253, filed on Jun. 8, 2006.

(30) Foreign Application Priority Data

Aug. 16, 2005 (CN) ............ 2005 1 0090770

(51) Int. Cl.
H04L 12/28 (2006.01)
(52) U.S. Cl. ...................................... 370/254
(58) Field of Classification Search ............... None
See application file for complete search history.

(56) References Cited

U.S. PATENT DOCUMENTS

| | | | |
|---|---|---|---|
| 7,292,581 B2 | 11/2007 | Finn | |
| 2001/0019554 A1* | 9/2001 | Nomura et al. | 370/389 |
| 2002/0143926 A1 | 10/2002 | Maltz et al. | |
| 2003/0028670 A1* | 2/2003 | Lee et al. | 709/241 |
| 2003/0099194 A1* | 5/2003 | Lee et al. | 370/229 |
| 2003/0103449 A1 | 6/2003 | Barsheshet et al. | |
| 2005/0071469 A1* | 3/2005 | McCollom et al. | 709/225 |
| 2006/0120288 A1* | 6/2006 | Vasseur et al. | 370/235 |
| 2006/0268739 A1* | 11/2006 | Garcia et al. | 370/254 |
| 2006/0268747 A1* | 11/2006 | van Haalen et al. | 370/256 |
| 2007/0195700 A1* | 8/2007 | Katoh et al. | 370/235 |
| 2007/0268821 A1* | 11/2007 | Levit et al. | 370/223 |

(Continued)

FOREIGN PATENT DOCUMENTS

JP 2003-298631 A 10/2003

(Continued)

OTHER PUBLICATIONS

Wenyi et al., "The Constraint-Based Routing to Implement Traffic Engineering in the Internet," *Computer Engineering and Applications*, 38(12) 141-143 (Dec. 2002).

(Continued)

*Primary Examiner*—Chirag G Shah
*Assistant Examiner*—Amarnauth Persaud
(74) *Attorney, Agent, or Firm*—Leydig, Voit & Mayer, Ltd.

(57) ABSTRACT

A method for implementing traffic engineering, TE, in layer 2, L2, network, includes: collecting TE information which is sent by respective L2 network devices according to extended network topology discovery protocol; calculating and deploying constraint-based routing with the collected TE information of the L2 network. The existing network topology discovery protocol is adopted in the L2 network, so that the L2 network devices do not have to support protocols such as OSPF and ISIS. Therefore, the present invention is helpful to avoid resource consumption of OSPF and ISIS protocols on the L2 network devices and reduce the complexity in implementation of the TE over the L2 network.

12 Claims, 3 Drawing Sheets

U.S. PATENT DOCUMENTS

2008/0016210 A1* 1/2008 Maekawa et al. ........... 709/224
2008/0016221 A1* 1/2008 Xu et al. .................... 709/226

FOREIGN PATENT DOCUMENTS

WO   WO 2004/039015 A2   5/2004

OTHER PUBLICATIONS

State Intellectual Property Office of the People's Republic of China, Examination Report in Chinese Patent Application No. 200510090770.0 (Jun. 5, 2009).

PCT Written Opinion of the International Searching Authority (Sep. 21, 2006).

Office Action from corresponding Canadian Patent Application No. 2,619,468, issued by the Canadian Intellectual Property Office (Jun. 14, 2010).

Wang, Wenyi, et al., The Constraint-based Routing to Implement Traffic Engineering in the Internet, Department of Computer Science, Zhengzhou University, Dec. 2002, China.

* cited by examiner

METHOD, SYSTEM AND DEVICE FOR IMPLEMENTING TRAFFIC ENGINEERING

CROSS-REFERENCE TO RELATED APPLICATIONS

This application is a continuation of International Patent Application No. PCT/CN2006/001253, filed Jun. 8, 2006, which claims priority to Chinese Patent Application No. 200510090770.0, filed Aug. 16, 2005, both of which are hereby incorporated by reference.

FIELD OF THE INVENTION

The present invention relates to the technical field of network communication, particularly to a method, system and device for implementing traffic engineering in a Layer 2 (L2) network.

BACKGROUND OF THE INVENTION

As Internet technology develops, Internet becomes more and more complex, and the traffic over Internet grows in an explosive manner. Because the Internet Protocol (IP) technique employs an Open Shortest Path First (OSPF) routing algorithm, each data stream is routed to the destination in the shortest path, which inevitably causes uneven traffic distribution among the paths. For example, some paths are congested with heavy traffic, while the others are in idle state and are not utilized effectively. As shown in FIG. 1, the path between node 1 and node 2 is congested with heavy traffic.

For the purpose of solving the problem of congestion resulting from uneven traffic distribution, a Traffic Engineering (TE) method is put forward, i.e. some traffic is led to relatively idle paths by force, so as to balance the traffic and alleviate congestion. As shown in FIG. 2, the traffic that was planned to be routed from node 1 via node 2 to node 4 is led to the path from node 1 via node 3 and node 2 to node 4.

Multi-Protocol Label Switch (MPLS) is a label switching technique, which can establish a Label Switch Path (LSP) in the IP network in advance, and when traffic comes into the network, switch the traffic along the LSP to the outlet. MPLS technique can import different traffic streams to different LSPs for switching.

MPLS TE is the best technique for implementing traffic engineering over the IP network; MPLS TE diverts the network traffic to idle paths by means of the LSPs established in advance with MPLS technique, thereby attaining the objective of traffic engineering.

At present, in the IP network, the procedures for implementing traffic engineering mainly include:

1. Collect the traffic engineering (TE) information of the IP network. The TE information is used to calculate TE paths. In MPLS TE technique, topology discovery is usually implemented by routing protocol extensions, such as Open Shortest Path First (OSPF) protocol, or Intermediate-System to Intermediate-System, ISIS) protocol. Those routing protocols can be used to collect network topology and relevant TE parameters.

2. Calculate TE routing according to the collected network TE information, with the current situation of network traffic as the constraint. In simple terms, it means to calculate how to route the traffic streams through appropriate paths without causing congestion in accordance with the current situation of the traffic. In MPLS TE technique, the commonly used constraint-based route calculation algorithm is Constraint-Based Shortest Path First (CSPF). To calculate the constraint-based routing, each device in the network should run the CSPF algorithm.

3. Deploy the calculated constraint-based paths into the network. In MPLS TE technique, constraint-based paths are referred to as Constraint-Route Based Label Switch Paths (CR-LSPs), which are usually deployed into the network with an MPLS TE messaging protocol. For example, the MPLS TE messaging protocol can be Resource reSerVation Protocol-Traffic Engineering (RSVP-TE).

4. Forward the traffic according to the deployed paths.

As Internet develops further, the access network part of some L2 networks (e.g. metropolitan area network (MAN)) becomes more and more complex, and the problem of uneven traffic distribution and congestion has occurred in such L2 networks. Therefore, it is an increasingly urgent task to deploy traffic engineering over L2 networks.

Presently, the method for deploying traffic engineering to L2 network is: migrate the MPLS TE applicable to IP network directly to L2 network.

However, because MPLS TE is implemented based on IP network, a prerequisite for normal operation of MPLS TE is: the entire network is accessible on the IP layer. Therefore, for the purpose of migrating MPLS TE technique into a L2 network, each device in the L2 network should be configured with the IP address and run IP protocol and IP routing protocol. What is more important, the CSPF algorithm, OSPF/ISIS routing protocol, and RSVP-TE protocol, etc., which consume software and hardware resources severely, must be run on each device in the L2 network. L2 devices are relatively simple devices by nature and only L2 switching function is required on these devices, and therefore, the costs of L2 devices can be very low. However, if IP protocol, OSPF/ISIS algorithm, CSPF algorithm, and RSVP-TE protocol are implemented over L2 devices, the complexity in software and hardware increases severely, and the equipment costs increase heavily. Furthermore, because each L2 device must be configured with an IP address, the consumption of IP address resource increases.

In addition, there is only an L2 network control plane in L2 network originally; however, after MPLS TE is migrated into the L2 network directly, an IP/MPLS control plane is added over the L2 network control plane. As a result, the network architecture and logic is more complex, the network deployment and maintenance work is more complex, and the on-going maintenance costs increase greatly.

SUMMARY OF THE INVENTION

The main object of the present invention is to provide a method for implementing traffic engineering (TE), and another object of the present invention is to provide a system and device for implementing TE, so as to reduce complexity in implementation of TE over L2 network.

To attain the above objects, the technical solution of the present invention is implemented as follows:

A method for implementing traffic engineering includes:

extending the network topology discovery protocol for L2 network, with the traffic engineering (TE) information required for traffic engineering;

collecting the TE information of the L2 network in the extended network topology discovery protocol;

calculating and deploying constraint-based routing, with the collected TE information of the L2 network.

The traffic engineering (TE) includes: MPLS TE.

The Network topology discovery protocol of the L2 network includes: resilient packet ring (RPR) based network topology discovery protocol, or a spanning tree protocol (STP), or a rapid spanning tree protocol (RSTP), or a multi-spanning tree protocol (MSTP), or private network topology discovery protocol.

The TE information includes: L2 network topology information and specific attributes of TE.

The procedure for extending the Network topology discovery protocol of the L2 network includes: adding type-length value, TLV, attribute to the Network topology discovery protocol of the L2 network;

the procedure for collecting TE information of L2 network includes: writing related TE attributes in the TLV attribute added to the Network topology discovery protocol of the L2 network, and filling the related network topology information in the existing attributes.

The TE attributes includes: link bandwidth, link priority, and link color.

The step for collecting the TE information of the L2 network further includes: transmitting the collected TE information of the L2 network to a predetermined network device;

The predetermined network device executes the procedure for calculating and deploying constraint-based routing.

The predetermined network device is: an existing advanced and complex network device in the L2 network, or a new dedicated server.

The procedure for calculating constraint-based routing includes: calculating and determining the Constraint Route-Based Label Switch Paths (CR-LSPs) for the traffic streams, by the predetermined network device, with the received TE information.

The procedure for deploying constraint-based routing includes: issuing the constraint-based routing to respective L2 network devices in the L2 network, by the predetermined network device, via a network management interface, in the network management protocol for the L2 network;

or, issuing the constraint-based routing to respective L2 network devices in the L2 network, by the predetermined network device, according to an L2 network control protocol.

A device for implementing TE, includes: a collecting unit, a constraint-based routing unit, and a deploying unit.

The collecting unit is configured to receive the TE information of the L2 network from the L2 network devices and transmit the received TE information to the constraint-based routing unit.

The constraint-based routing unit is configured to determine the constraint-based routing with the received TE information of the L2 network and transmit the constraint-based routing to the deploying unit.

The deploying unit is configured to distribute the received constraint-based routing to respective L2 network devices in the L2 network.

The deploying unit is also configured to distribute the received constraint-based routing to respective L2 network devices in the L2 network, in the network management protocol or control protocol for the L2 network.

A system for implementing TE, includes: L2 network devices and a predetermined network device.

The L2 network devices are configured to collect the TE information of the L2 network in the extended network topology discovery protocol and transmit the TE information to the predetermined network device.

The predetermined network device is configured to calculate the constraint-based routing with the received TE information of the L2 network and deploy the calculated constraint-based routing to the L2 network devices.

The predetermined network device is: an existing advanced and complex network device in the L2 network, or a new dedicated server.

It is seen from the above description of the technical solution: the present invention takes full advantage of the existing network topology discovery protocol for L2 network to collect the TE information required for MPLS TE; therefore, the L2 network devices are not required to support OSPF or ISIS protocol, etc. As a result, the present invention can avoid resource consumption of OSPF or ISIS protocol, or similar protocols on L2 network devices, thereby reducing complexity in implementation of TE over L2 network. In addition, by collecting TE information and calculating and deploying constraint-based routing centrally, the process of individually calculating and deploying constraint-based routing on the network devices in L2 network is avoided in the present invention. Therefore, TE can be implemented over the L2 network without adding an IP/MPLS control plane to the L2 network, and the requirement of TE for L2 network devices can be reduced.

More specifically, in the present invention, the constraint-based routing calculation process is accomplished by a predetermined network device. Therefore, there is no need to implement the complex CSPF algorithm on the L2 network devices, and the resource consumption of the CSPF algorithm on the L2 network devices can be avoided; by utilizing the existing network management interface and L2 network control protocol in the L2 network devices to deploy constraint-based routing, the L2 network devices do not have to support RSVP-TE protocol, and thereby the resource consumption of RSVP-TE protocol on the L2 network devices can be reduced. In the present invention, there is no need to configure IP address on the L2 network devices, and therefore the IP address resource can be saved. Existing and proven techniques in L2 network are fully utilized in the present invention and the risk in implementing TE in L2 network is reduced. As a result, with the technical solution provided in the present invention, the implementation and maintenance costs of TE over L2 network can be reduced, and the practicability of TE can be improved.

DETAILED DESCRIPTION OF THE EMBODIMENTS

If the existing resources in the L2 network can be utilized to collect TE information of the L2 network, there is no need to add additional protocols such as OSPF/ISIS on each L2 network device to implement TE, and thereby the method for implementing TE over L2 network can be simplified. In addition, if the TE information acquisition process, constraint-based routing calculation process, and constraint-based routing deployment process can be converged to one or several specific network devices to implement TE, there is no need to carry out these processes on each L2 network device, and thereby no need to add IP protocol, CSPF algorithm, RSVP-TE protocol, etc. on each L2 network device to support constraint-based routing calculation and constraint-based routing deployment on each L2 network device. As a result, the requirements for the L2 network devices can be reduced in implementation of TE.

On the basis of the above considerations, the present invention puts forward a method for implementing TE, which mainly includes: extending the Network topology discovery protocol of the L2 network in accordance with the TE information required for implementation of TE; collecting TE information of the L2 network in the extended network topology discovery protocol; and, calculating and deploying constraint-based routing with the collected TE information of the L2 network.

Figure 1:
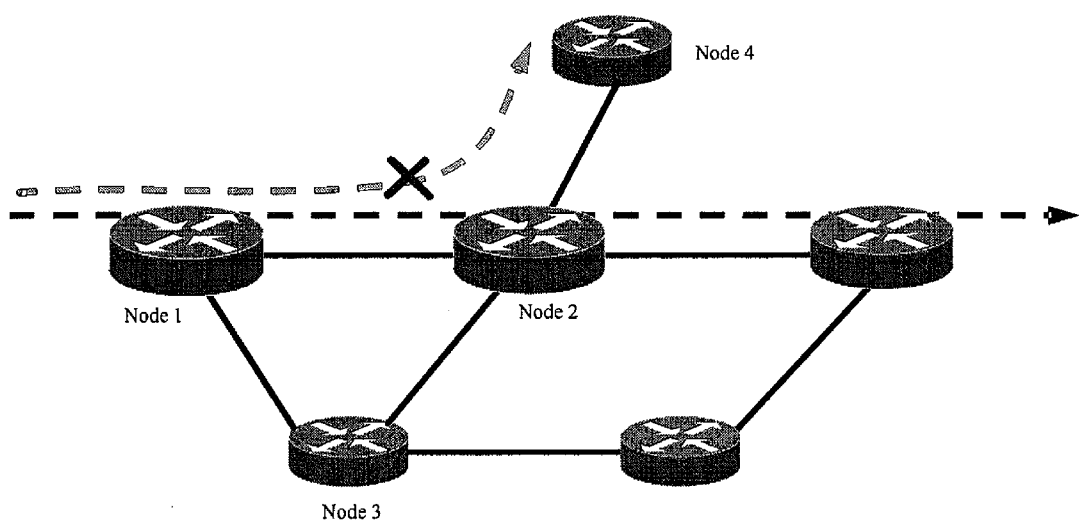
FIG. 1 is a schematic diagram of path congestion resulting from the Open Shortest Path First (OSPF) algorithm.
Figure 2:
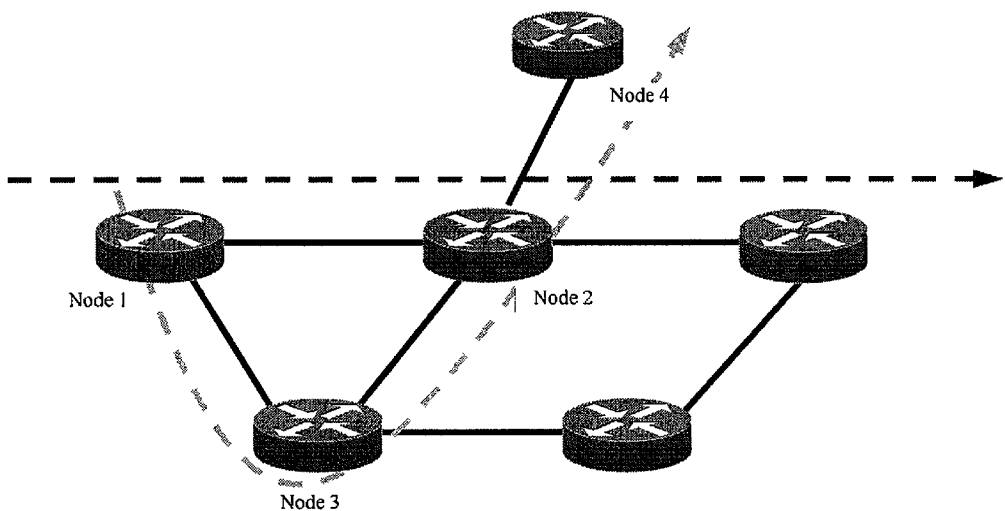
FIG. 2 is a schematic diagram of prevention of path congestion by means of traffic engineering (TE)
Figure 3:
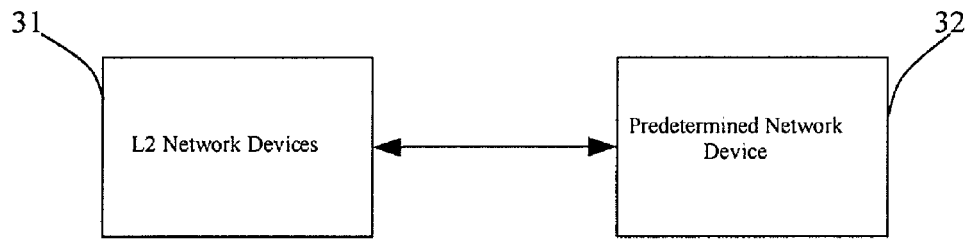
FIG. 3 is a structural representation of the system provided in the present invention.

Accordingly, the present invention further puts forward a system for implementing TE. FIG. 3 is a structural representation of the system provided in the present invention. As shown in FIG. 3, the basic structure of the system includes: L2 network devices 31 and a predetermined network device 32.

The L2 network devices 31 are configured to collect the TE information of the L2 network in the extended network topology discovery protocol and transmit the TE information to the predetermined network device 32.

The predetermined network device 32 is configured to calculate and deploy constraint-based routing with the collected TE information of the L2 network.

To make the objects, technical solution, and advantages of the present invention understood better, hereunder the present invention is further detailed in the embodiments, in conjunction with the accompanying drawings.

Figure 4:
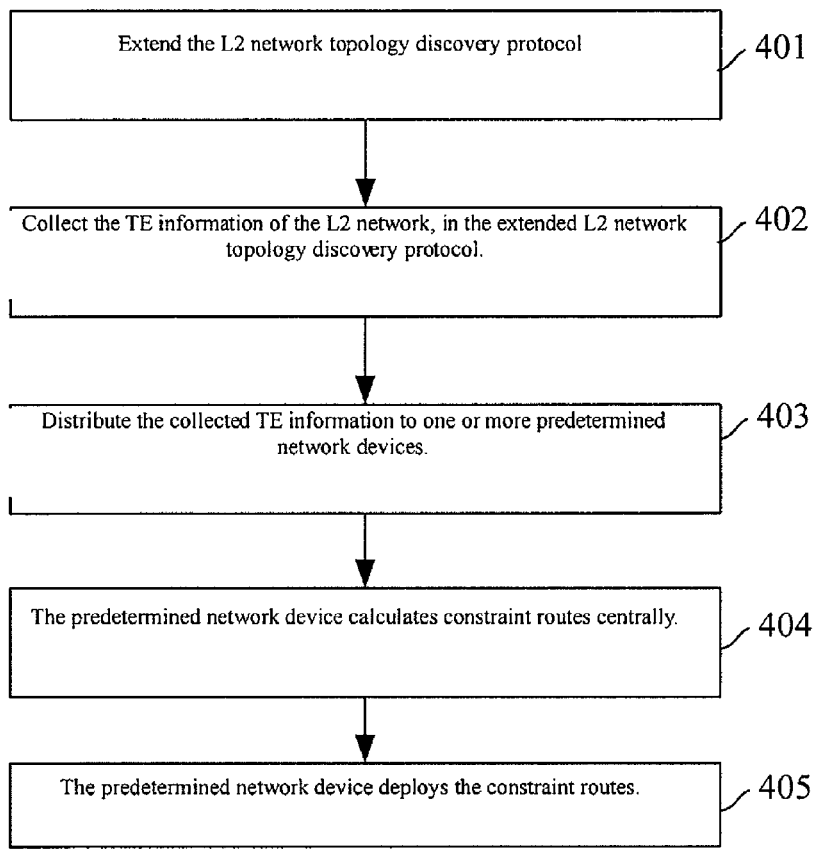
FIG. 4 is a flow diagram of an embodiment of the present invention.

FIG. 4 is a flow diagram of an embodiment of the present invention. As shown in FIG. 4, in the present invention, the process of implementing TE over a L2 network (e.g. a MPLS network) includes the following steps:

Step 401: extend the Network topology discovery protocol of the L2 network in accordance with the TE information required for the TE.

The procedure for extending the Network topology discovery protocol of the L2 network includes: add a new TLV (Type Length Value) attribute to the Network topology discovery protocol of the L2 network, so as to identify specific TE attributes, including link bandwidth, link priority, and link color, etc. In addition, the Type field in the TLV attribute represents the type of the attribute; the Length field represents the length of the entire TLV attribute; the Value field represents the value of the attribute. Each link attribute, such as link bandwidth, priority, or color, should be filled in a separate TLV.

The existing network topology discovery protocol for L2 network is fully utilized to collect the TE information required for MPLS TE in the present invention; by extending the existing network topology discovery protocol for L2 network simply, i.e. adding the TLV attribute to the existing network topology discovery protocol of the L2 network, the specific TE attributes required for TE calculation can be collected in the subsequent procedures.

In this way, the L2 network devices 31 do not have to support complex and bulky protocols such as OSPF and ISIS, and therefore the resource consumption of OSPF or ISIS protocol on the L2 network devices 31 can be avoided. As a result, the complexity of software and hardware of the L2 network devices 31 is reduced greatly, the complexity of the L2 network is reduced, and the L2 network deployment and maintenance costs are also reduced.

The existing network topology discovery protocol for L2 network can be: network topology discovery protocol for Resilient Packet Ring (RPR), or Spanning Tree Protocol (STP) for L2 Ethernet, or Rapid Spanning Tree Protocol (RSTP), or Multi-Spanning Tree Protocol (MSTP). In addition, the existing network topology discovery protocol for L2 network can be a private network topology discovery protocol.

Step 402: Collect the TE information of the L2 network according to the extended Network topology discovery protocol of the L2 network.

In the present invention, the TE information required for the TE includes: network topology information of L2 network and specific TE attributes. The specific TE attributes include link bandwidth, link priority, and link color, etc.

This step can be implemented as follows: All L2 devices in the L2 network fill their TE attributes in the extended network topology discovery protocol, i.e. they write their specific TE attributes (e.g. link bandwidth, link priority, and link color, etc.) in the TLV attributes added to the Network topology discovery protocol of the L2 network and fill related network topology information in the existing attributes.

Step 403: Distribute the collected TE information to one or more predetermined network devices 32 using the network in the extended topology discovery protocol, so that the predetermined network device(s) 32 obtain the TE information of the entire network.

Step 404: The predetermined network devices 32 calculate the constraint-based routing centrally, for example, they calculate the CR-LSP for each traffic stream.

In the present invention, the predetermined network devices 32 responsible for constraint-based routing calculation can be either relatively advanced or complex network devices in the L2 network or additional servers that are arranged specially for implementing TE. In this way, there is no need to implement complex CSPF algorithm on a number of network devices in the L2 network, and therefore the resource consumption of CSPF algorithm on the L2 network devices 31 can be avoided, and the complexity of software and hardware of L2 network devices 31 can be reduced, and the costs of the L2 network devices 31 can be reduced.

Step 405: The predetermined network device 32 deploys the constraint paths.

Here, after the predetermined network device(s) 32 determines the CR-LSP for each traffic stream, the predetermined network device(s) 32 can utilize the network management interface or other L2 network control protocols (e.g. some configuration distribution protocols) available on all L2 network devices to deploy CR-LSPs.

For example, this step can be implemented as follows: the predetermined network device 32 responsible for constraint-based routing calculation deploys the calculated CR-LSPs to other network devices according to the L2 network management protocol via the network management interface; or, the predetermined network device responsible for constraint-based routing calculation deploy the CR-LSPs to other network devices according to a configuration distribution protocol. In this way, deployment of constraint paths is implemented in the present invention by means of slightly expanding the existing other network devices in the L2 network; therefore, a number of L2 network devices 31 don't have to support protocols such as RSVP-TE. As a result, the resource consumption of such protocols (e.g. RSVP-TE) on the L2 network devices 31 can be avoided, the complexity of software and hardware of the L2 network devices 31 can be reduced, and the deployment and maintenance costs for implementing TE over L2 network can be reduced.

Figure 5:
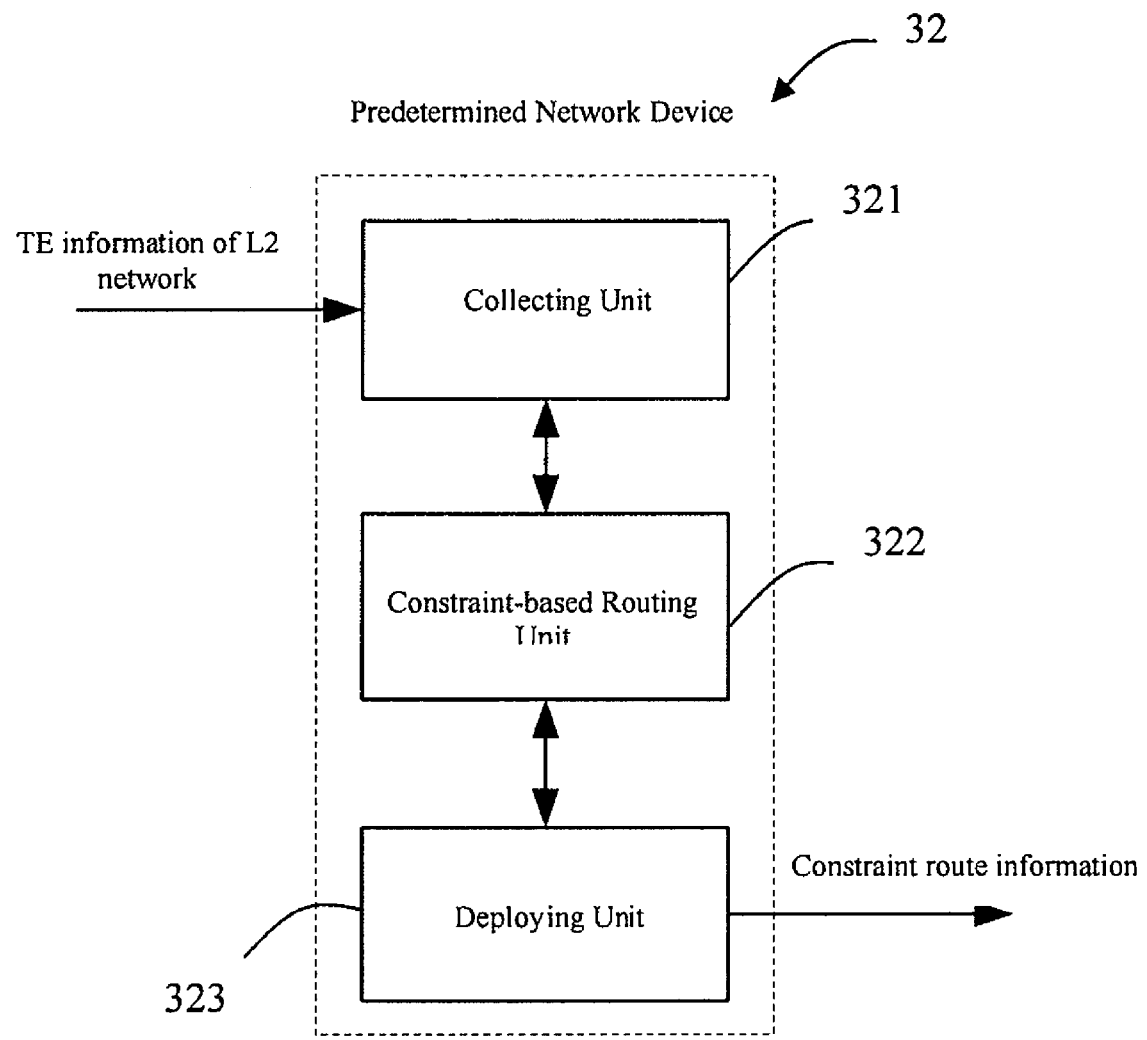
FIG. 5 is a structural representation of the device for implementing TE provided in the present invention.

FIG. 5 is a structural representation of the device for implementing TE provided in the present invention. As shown in FIG. 5, in the present invention, the devices for implementing TE, i.e. the above-mentioned predetermined network device 32, can be either relatively advanced and complex network device in the L2 network or additional dedicated server for implementing TE. In addition, such a device for implementing TE includes:

a collecting unit 321, configured to receive the TE information of the L2 network from the L2 network devices and transmit the received TE information to the constraint-based routing unit 322;

a constraint-based routing unit 322, configured to calculate and determine the constraint-based routing (e.g. CR-LSPs) according to the received TE information of the L2 network and transmit the constraint-based routing to a deploying unit 323; and a deploying unit 323, configured to issue the received constraint-based routing to respective L2 network devices 31 in the L2 network, the deploying being capable of deploying CR-LSPs according to the network management protocol via the network management interface available in the L2 network devices 31, or deploy CR-LSPs with other L2 network control protocols (e.g. some configuration distribution protocols).

It is seen from above description: the requirements of MPLS TE for the L2 network devices 31 are reduced according to the present invention, so that the L2 network devices 31 can support MPLS TE by use of minimum expansion of the software and hardware. Therefore, the present invention is helpful to reduce the software and hardware costs for implementing MPLS TE in L2 network, the complexity of L2 network in implementation of MPLS TE, and the ongoing maintenance costs of MPLS TE.

While the present invention has been illustrated and described in conjunction with some preferred embodiments, the present invention is not limited to these. Those skilled in the art should recognize that various variations and modifications can be made without departing from the scope of the present invention as defined by the accompanying claims.

The invention claimed is:

1. A method for implementing traffic engineering, TE, comprising:
    collecting TE information which is sent by respective L2 network devices according to network topology discovery protocol, wherein the network topology discovery protocol is an L2, network topology discovery protocol that is extended by adding a type-length value (TLV) attribute, in accordance with the TE information required for an implementation of TE;
    calculating and deploying constraint-based path according to the collected TE information of the L2 network devices;
    wherein the TE information comprises: network topology information of the L2 network and specific TE attributes; and
    wherein the collecting TE information which is sent by respective L2 network devices according to network topology discovery protocol comprises: writing related specific TE attributes in the TLV attribute added to the Network topology discovery protocol of the L2 network, and filing related network topology information in the existing attributes.

2. The method according to claim 1, wherein, the TE comprises: Multi-Protocol Label Switch, MPLS, TE.

3. The method according to claim 1, wherein the Network topology discovery protocol of the L2 network comprises: a resilient packet ring, RPR, based network topology discovery protocol, or a spanning tree protocol, STP, or rapid spanning tree protocol, RSTP, or a multi-spanning tree protocol, MSTP, or a private network topology discovery protocol.

4. The method according to claim 1, wherein, the specific TE attributes comprise: link bandwidth, link priority, or link color.

5. The method according to claim 1, wherein the constraint-based path is a Constraint-based routing-Based Label Switch Path.

6. The method according to claim 1, further comprising: issuing the constraint-based path to respective L2 network devices in the L2 network according to the L2 network management protocol via a network management interface.

7. The method according to claim 1, wherein, the specific TE attributes comprise: link bandwidth, link priority, or link color.

8. The method according to claim 1, further comprising: issuing the constraint-based path to respective L2 network devices in the L2 network according to the L2 network management protocol via a network management interface.

9. A device for implementing traffic engineering, comprising: a collecting unit, a constraint-based path unit, and a deploying unit, wherein:
    the collecting unit is configured to collect TE information which is sent by respective L2 network devices according to network topology discovery protocol, wherein the network topology discovery protocol is an extended network topology discovery protocol of an L2 network in accordance with the TE information required for an implementation of TE;
    the constraint-based path unit is configured to determine a constraint-based path according to the received TE information of the L2 network and transmit the determined constraint-based path to the deploying unit; and
    the deploying unit is configured to issue the received constraint-based path to respective L2 network devices in the L2 network;
    wherein, the TE information comprises: network topology information of the L2 network and specific TE attributes;
    adding type-length value, TLV, attribute to the extended network topology discovery protocol of the L2 network; and
    wherein the collecting TE information which is sent by respective L2 network devices according to network topology discovery protocol comprises: writing related specific TE attributes in the TLV attribute added to the Network topology discovery protocol of the L2 network, and filing related network topology information in the existing attributes.

10. The device according to claim 9, wherein, the deploying unit is further configured to distribute the received constraint-based path to respective L2 network devices in the L2 network according to a network management protocol via a network management interface available in the L2 network devices, or with a network.

11. A system for implementing traffic engineering, comprising: an L2 network device and a predetermined network device, wherein:
    the L2 network device is configured to collect TE information which is sent by respective L2 network devices according to network topology discovery protocol and transmit the TE information to the predetermined network device, wherein the network topology discovery protocol is an extended network topology discovery protocol of an L2 network in accordance with the TE information required for an implementation of TE; and the predetermined network device is configured to calculate a constraint-based path according to the received TE information of the L2 network and deploy the calculated constraint-based path to the L2 network device;

wherein, the TE information comprises: network topology information of the L2 network and specific TE attributes;

adding type-length value, TLV, attribute to the extended network topology discovery protocol of the L2 network; and wherein the collecting TE information which is sent by respective L2 network devices according to network topology discovery protocol comprises: writing related specific TE attributes in the TLV attribute added to the Network topology discovery protocol of the L2 network, and filing related network topology information in the existing attributes.

12. The system according to claim 11, wherein, the predetermined network device is: an existing advanced and complex network device in the L2 network, or a new dedicated server.

* * * * *

UNITED STATES PATENT AND TRADEMARK OFFICE
CERTIFICATE OF CORRECTION

| | |
|---|---|
| PATENT NO. | : 7,826,394 B2 |
| APPLICATION NO. | : 12/031350 |
| DATED | : November 2, 2010 |
| INVENTOR(S) | : Deng |

Page 1 of 1

It is certified that error appears in the above-identified patent and that said Letters Patent is hereby corrected as shown below:

Column 8, line 56 Claim 10, "a network" should read --control protocol for the L2 network--.

Signed and Sealed this
Twenty-fifth Day of January, 2011

David J. Kappos
*Director of the United States Patent and Trademark Office*